(12) United States Patent
Chand et al.

(10) Patent No.: US 8,406,427 B2
(45) Date of Patent: Mar. 26, 2013

(54) COMMUNICATION NETWORK WITH SECURE ACCESS FOR PORTABLE USERS

(75) Inventors: Naresh Chand, Warren, NJ (US); Bruce M. Eteson, Hackettstown, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 346 days.

(21) Appl. No.: 12/587,743

(22) Filed: Oct. 13, 2009

(65) Prior Publication Data

US 2011/0087879 A1    Apr. 14, 2011

(51) Int. Cl.
*H04L 29/06*    (2006.01)
(52) U.S. Cl. .................... 380/255; 713/150; 709/227
(58) Field of Classification Search .................. None
See application file for complete search history.

(56) References Cited

U.S. PATENT DOCUMENTS

| | | | |
|---|---|---|---|
| 2002/0059516 A1* | 5/2002 | Turtiainen et al. | 713/153 |
| 2004/0180650 A1* | 9/2004 | Kamemura et al. | 455/422.1 |
| 2005/0120082 A1* | 6/2005 | Hesselink et al. | 709/203 |
| 2007/0210956 A1* | 9/2007 | Hillis et al. | 342/179 |
| 2008/0120657 A1* | 5/2008 | Dong | 725/82 |
| 2008/0140868 A1* | 6/2008 | Kalayjian et al. | 710/8 |
| 2008/0145056 A1* | 6/2008 | Boldi et al. | 398/96 |

FOREIGN PATENT DOCUMENTS

| | | | |
|---|---|---|---|
| EP | 1011215 A2 | 6/2000 | |
| EP | 1079553 A2 | 2/2001 | |

OTHER PUBLICATIONS

J. M. Kahn, et al., Wireless Infrared Communications, Proceedings of IEEE, vol. 85, No. 2 (Feb. 1997).
Motorola i930 / i920 Specs & Features, on-line publication (undated).
Tom's Networking, Linksys WIP330 Wireless-G IP Phone, on-line publication (undated).
A. Noser, Combining VoIP and Wireless Services, North Carolina State University, on-line publication (undated).
R. Cheung, Using IrDA in Wireless LAN-Attach Design, CommsDesign, on-line publication (Jan. 2006).
International Searching Authority, International Search Report for Int'l Appl'n No. PCT/US 10/51755 (Dec. 2, 2010).

* cited by examiner

*Primary Examiner* — Farid Homayounmehr
*Assistant Examiner* — Lisa Lewis
(74) *Attorney, Agent, or Firm* — Leo Zucker

(57) ABSTRACT

A communication network includes a local area network (LAN) and a wireless access point coupled to the LAN. In one embodiment, each access point includes a medium access control (MAC) stage, and a radio frequency (RF) transmitter/receiver for communicating unsecure message data via RF links with users of associated wireless devices. An optical transmitter/receiver in the access point enables the users to communicate secure message data over the LAN via free space optical (FSO) links with the users. The MAC stage operates (i) to direct unsecure data from the LAN to the wireless device users and to direct unsecure data from the users to the LAN, via the RF transmitter/receiver; and (ii) to direct secure data from the LAN to the wireless device users and to direct secure data from the users to the LAN, via the optical transmitter/receiver. An integrated VoIP/FSO portable handset is also disclosed.

8 Claims, 10 Drawing Sheets

Optical transmitter and quad detector for a mobile user

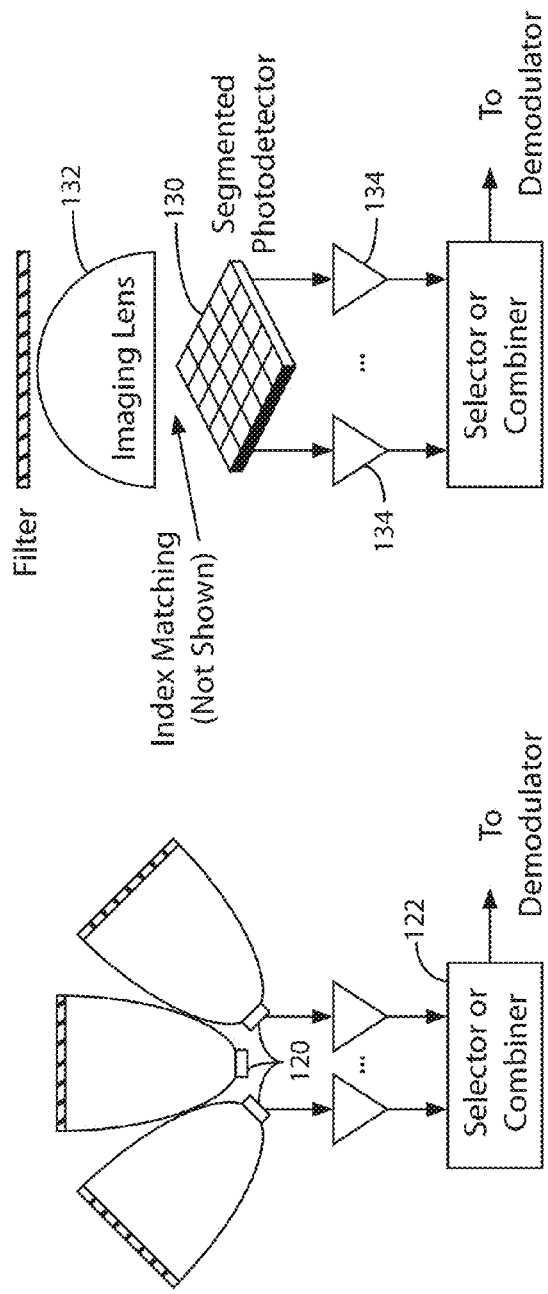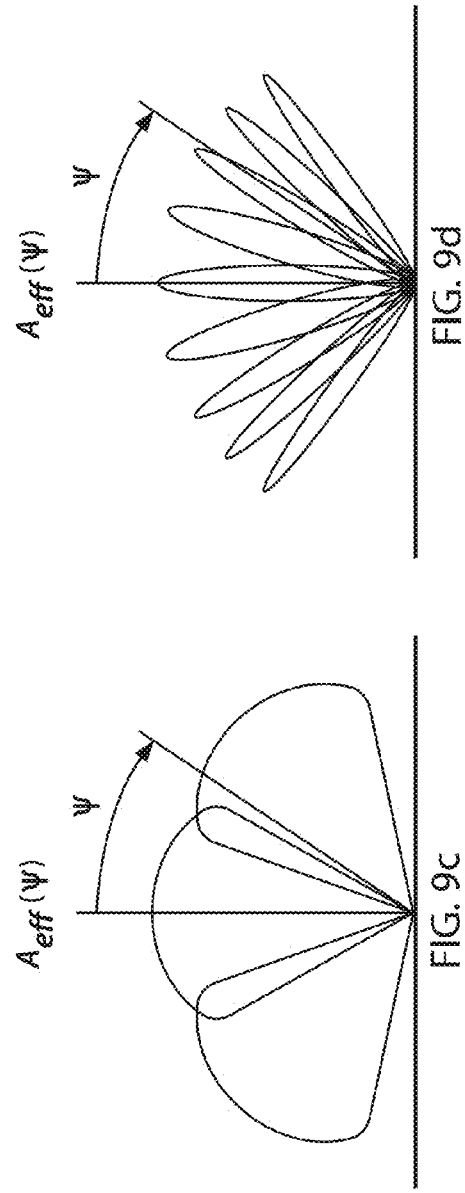

COMMUNICATION NETWORK WITH SECURE ACCESS FOR PORTABLE USERS

BACKGROUND OF THE INVENTION

1. Field of the Invention

This invention relates to communication networks, and particularly to a network that provides portable users with secure access when exchanging information with other users on the network.

2. Discussion of the Known Art

As military conflicts are being resolved more through the use of a network-centric rather than a platform-centric paradigm, vital communications over the established networks must be secure, reliable, interoperative, survivable, and timely. The implementation of a high capacity, multimedia network is also desirable.

Free space optical (FSO) or photonic communication links have been deployed in fixed, point-to-point links for commercial and military applications. Such links may be preferred over microwave or millimeter wavelength radio frequency (RF) links for short range communications, especially when other communication infrastructure is unavailable, unreliable, or untrustworthy. FSO links have the following advantages:

1. The links are highly directional, and therefore quite immune to interception, interference or jamming.
2. Secure communications during periods of radio silence.
3. Elimination of any detectable RF signature.
4. FSO terminals can be made small, lightweight, and are easily portable. Optical antennas including light emitters (e.g., laser LEDs) and detectors (e.g., photodiodes) have typical gains on the order of one million times those of isotropic RF antennas.
5. Low power consumption.
6. The availability of a wide frequency spectrum with no governmental regulatory restrictions.
7. Large data bandwidth capacity.
8. Direct baseband signaling, thus simplifying modulation and demodulation processes.
9. Ease of multiplexing, de-multiplexing, and switching of optical channels.
10. Tactically useful range.

Projects are being pursued that would enable laser communication on the move between platforms ground to ground, ground to air, air to air, air to satellite, and satellite to air. Infrared (IR) light sources and detectors suitable for use in high data rate FSO transmitters and receivers are commercially available at low cost.

IR light penetrates clear glass but will not propagate through walls or other opaque building structures. FSO links are therefore confined to rooms or other areas inside buildings where the links are established. Such confinement enhances the security of FSO transmissions against interception or casual eavesdropping, and avoids interference between optical links operating in physically separate regions, thus making possible a high degree of spectrum reuse. Also, while multipath fading may cause signals to fluctuate in strength and phase over RF links, FSO links are immune to fading if intensity modulation and direct detection (IM/DD) techniques are applied. See, J. M. Kahn et al., "Wireless Infrared Communications", 85 (2) Proceedings of the IEEE (Feb. 1997), at 265-98, which is incorporated by reference.

Portable Infrared (IR) Devices

For short range (up to a few meters) applications, consumer devices are available that allow data to be transferred between the devices via infrared light. The Infrared Data Association (IrDA) defines specifications for point-to-point communication using directional half duplex serial IR links through space, at data rates up to and including 115.2 kbit/s; 0.576 Mbps, 1.152 Mbps, 4.0 Mbps and 16 Mbps. Cell phones are available with IR ports that follow these standards for enabling the phones to dump data into stationary printers, PDAs, or PCs equipped with IR ports. See "Motorola i930/i920", at <www.phonescoop.com/phones/phone.php?p=627>. IR ports of typical cell phones do not carry active voice communications and, as mentioned, are limited in range to 1 to 2 meters.

VoIP Telephony and Wireless Local Area Networks

The use of voice-over-Internet protocol (VoIP) telephony, both wired and RF wireless, is expanding. In a conventional circuit switched telephone system, a dedicated physical connection is established between a calling and a called party over the duration of the call. The continuous connection assures that voice signals carried between end points of the system are not interrupted. With a VoIP system, however, there is no dedicated connection. Instead, analog voice signals from a microphone transducer in a user's handset or headset are digitized, and corresponding digital data is transmitted over a system network in separate groups of data called "packets". Each packet contains the sender's and the recipient's IP addresses, and a piece of digitized voice information ("payload" data). The packets may be routed through the network over different paths, and eventually arrive with some delay at a common destination to be recombined in the proper sequence. Further, each packet may arrive with a different delay. Variations in arrival time are defined as "jitter". Some packets may never reach the destination, resulting in "packet loss". Most vendors adhere to strict limits on tolerable packet loss, delay, and jitter. For example, Cisco Systems adopted the following guidelines for VoIP network operation:

| Network Performance | Value |
| --- | --- |
| Delay | <=150 milliseconds (ms) one-way |
| Jitter | <=30 ms |
| Packet loss | <=1% |

VoIP may offer many features above and beyond those afforded by traditional telephony systems, whether wired or remote. See, e.g., A. Noser, "Combining VoIP and Wireless Services", at <www.ncstate.net/wireless/presentations/wirelessvoip/wirelessvoip.html>, which is incorporated by reference. Manufacturers claim their wireless VoIP products allow mobile users to engage in conversations anywhere in an IP network with reliability and voice quality equivalent to that of a desktop office phone. Internet gateways and RF access points are positioned to ensure that user conversations do not drop out or experience gaps, regardless of a user's location within a defined area. As voice quality, reliability and security improve, IP wireless communication including the use of convenient portable VoIP handsets is likely to increase.

A typical VoIP local area network (LAN) 10 is illustrated in FIG. 1 including commercial off-the-shelf (COTS) products. To connect with a legacy public telephone switching exchange (PBX) 12, a telephony gateway 14 is configured to convert analog voice signals received over the PBX 12 into IP voice data packets. The packets are routed through an Ethernet cable 15 that connects with RF wireless access points 16. Voice data packets arriving at the gateway 14 over the cable 15 are converted to analog voice signals for transmission into the PBX 12. The gateway 14 may be omitted if the PBX 12 is a so-called telephony server.

The access points 16 may comprise RF wireless routers each of which operates according to, e.g., known IEEE 802.11x signaling protocols. A voice priority server 20 available, for example, from Spectralink SVP® may be provided to ensure that the voice data packets have priority over other kinds of data carried over the network 10. The access points 16 may join or bridge various wireless clients such as, for example, a number of portable VoIP telephone sets 26, a notebook computer 27 and a PDA 28, with fixed users and devices connected by wire to the network 10.

FIG. 2 shows a typical high level architecture for a wireless access point 16. Access point 16 may operate, for example, under one or more defined RF signaling protocols per the IEEE Standards 802.xxx. Because voice data transmitted by a user of a RF device may be received by users of like RF devices within range, some security measures are available to ensure that a user's data is not captured or manipulated by unauthorized intruders. When classified or other highly sensitive voice messages are involved, however, commercial security (COMSEC) is insufficient for the task. For example, adding improved Type I security can significantly increase cost and management complexity, since such security must be controlled and crypto keys must be managed.

Wireless VoIP Phone Sets

Several vendors provide RF wireless VoIP telephone sets that can access a LAN using IEEE 802.11x or other newly emerging IEEE 802.xxx RF signaling protocols. For example, a model WIP330 Wireless-G IP Phone from Linksys. A block diagram of a typical wireless VoIP telephone 26 is shown in FIG. 3. Core subsystems include:

An RF transceiver/power amplifier 30 that performs frequency translation between the RF and the baseband (voice) signals, and amplifies RF signals to be radiated from the phone from an antenna 31.

A medium access control (MAC)/baseband processor 32 which implements the applicable IEEE 802.xxx protocols and provides modem functionality to control wireless signaling and communication between the telephone 26 and the wireless access points of the LAN.

A DSP/microcontroller/OMAP 34 that executes VoIP call controls and voice processing, and provides a user interface.

Various memories including flash, ROM and RAM stages for storing programming code, voice and other data.

A voice coder-decoder (CODEC) 36 which interfaces with a user headset 37 having a microphone 38 and a speaker or earpiece 39. The CODEC 36 operates to convert a user's analog voice signals as produced by the microphone 38, into corresponding digital voice data to be processed by the OMAP 34.

The RF bandwidth required for each voice call depends on (i) the type of CODEC 36, (ii) the number of CODEC samples per data packet, and (iii) the packet header compression. The number of CODEC samples per packet affects the delay of a VoIP call. As the size of the sample data increases, the required bandwidth decreases but the overall delay increases.

As mentioned, if a wireless VoIP telephone set user desires to discuss classified subject matter, COMSEC items must be provided thereby increasing equipment cost and management complexity. Accordingly, there is a need for a robust multi-user local area wireless network that is not only capable of interfacing with current VoIP telephone sets, but which also provides security for portable users who want to convey sensitive information without having to invoke costly COMSEC measures.

SUMMARY OF THE INVENTION

The inventive network allows a portable user to engage in wireless communications wherein normal messaging is routed over a RF link with the user, and classified or other highly sensitive messages are contained over a secure FSO link that can be established by or with the user when desired.

According to the invention, a communication network includes a local area network (LAN) and a wireless access point coupled to the LAN. In one embodiment, each access point includes a medium access control (MAC) stage, and a radio frequency (RF) transmitter/receiver for communicating unsecure message data via RF links with users of associated wireless devices. An optical transmitter/receiver in the access point enables the users to communicate secure message data over the LAN via free space optical (FSO) links with the users.

The MAC stage operates (i) to direct unsecure data from the LAN to the wireless device users and to direct unsecure data from the users to the LAN, via the RF transmitter/receiver; and (ii) to direct secure data from the LAN to the wireless device users and to direct secure data from the users to the LAN, via the optical transmitter/receiver.

According to another aspect of the invention, a wireless handset includes a message data source, and a radio frequency (RF) transceiver for transmitting RF signals corresponding to unsecure message data to a network access point, and for receiving RF signals corresponding to unsecure message data radiated from the access point. An optical transceiver operates to transmit free space optical (FSO) signals corresponding to secure message data to an optical access antenna system associated with the access point, and to receive FSO signals corresponding to secure message data emitted from the optical antenna system. A switching stage has a first port coupled to the message data source, a second port coupled to the RF transceiver, and a third port coupled to the optical transceiver. The switching stage is configured to couple the message data source to the RF transceiver for unsecure message data, and to the optical transceiver for secure message data.

For a better understanding of the invention, reference is made to the following description taken in conjunction with the accompanying drawing and the appended claims.

BRIEF DESCRIPTION OF THE DRAWING

In the drawing:

FIG. 7(*b*) illustrates a second embodiment of the optical access antenna system;

FIGS. 9(*a*) to 9(*d*) illustrate arrays of light receiving elements that may form part of each optical antenna in the system of FIG. 7(*a*) or FIG. 7(*b*).

DETAILED DESCRIPTION OF THE INVENTION

Figure 4:
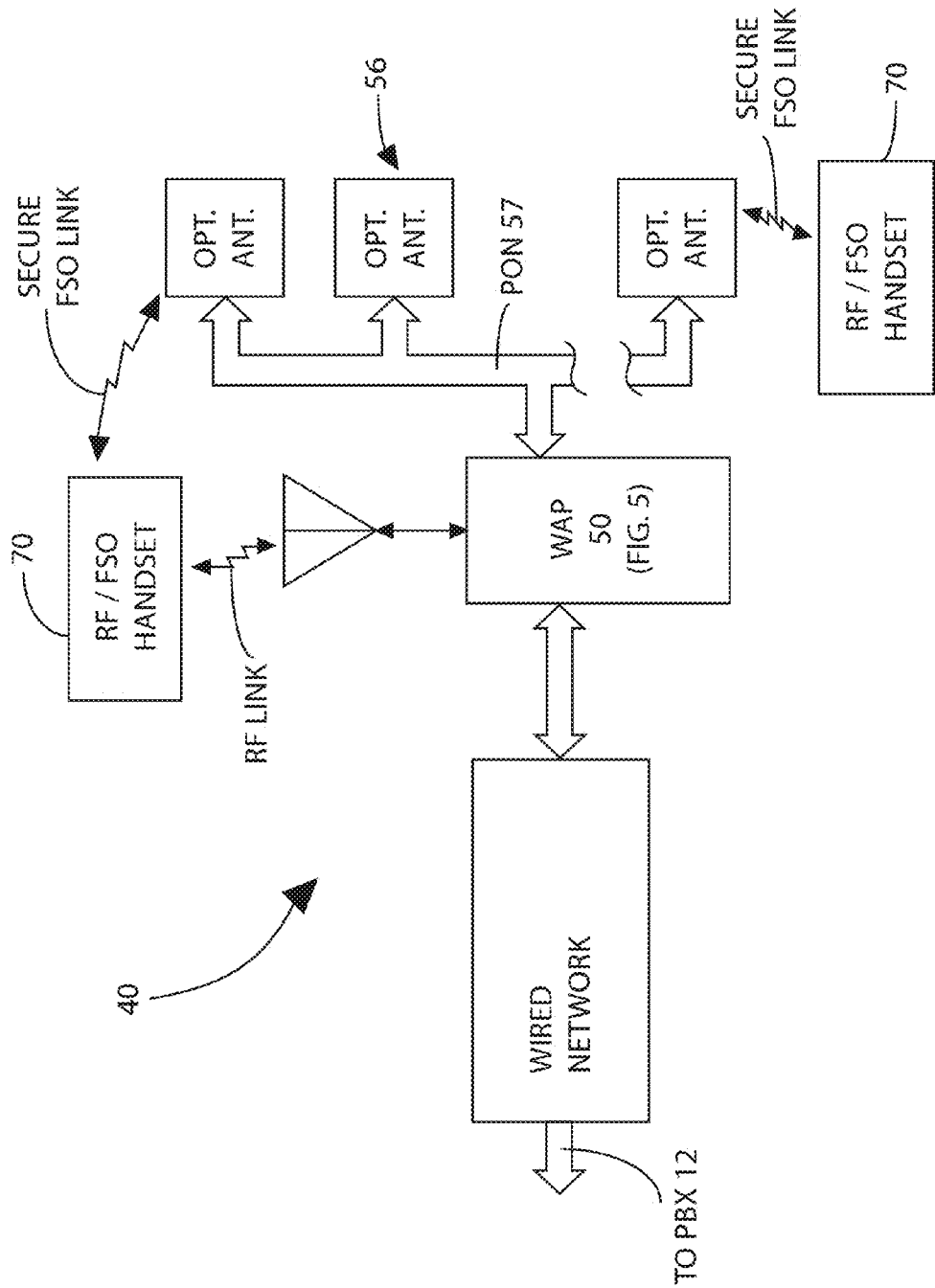
FIG. 4 is a block diagram of a communication network according to the invention.

FIG. 4 is a schematic block diagram of a communication network 40 according to the invention. The network 40 has one or more associated wireless access points (WAP) 50, described below, which enable the network to be accessed by users of one or more portable handsets or headsets 70. In addition to signaling via RF links with the access points 50, the handsets 70 are capable of establishing FSO links when necessary to exchange secure (e.g., classified) voice data over the network 40. Details of the handsets 70 are set out below in connection with FIG. 6.

Figure 1:
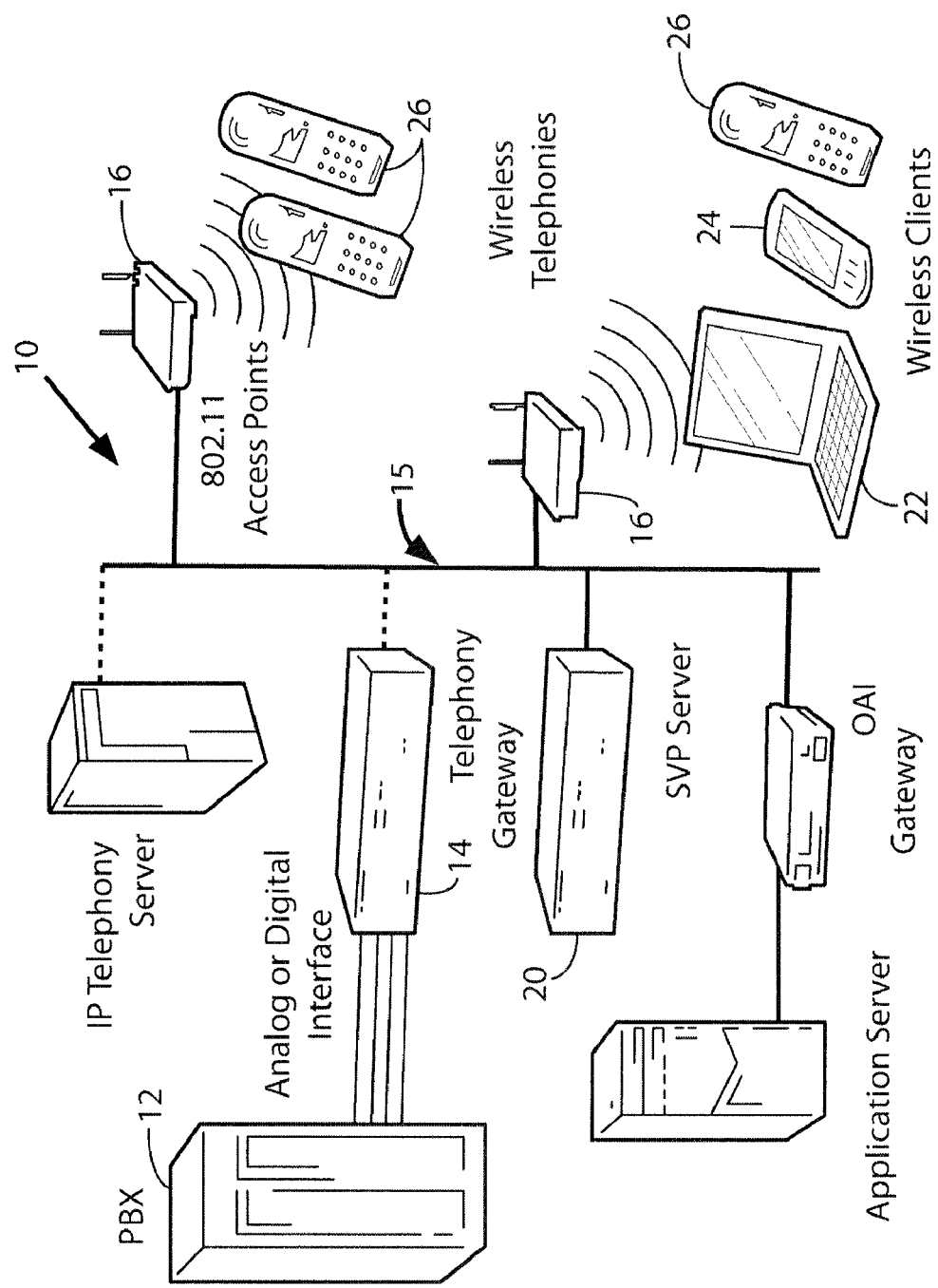
FIG. 1 is a block diagram of a typical local area network (LAN) with wireless access points.
Figure 2:
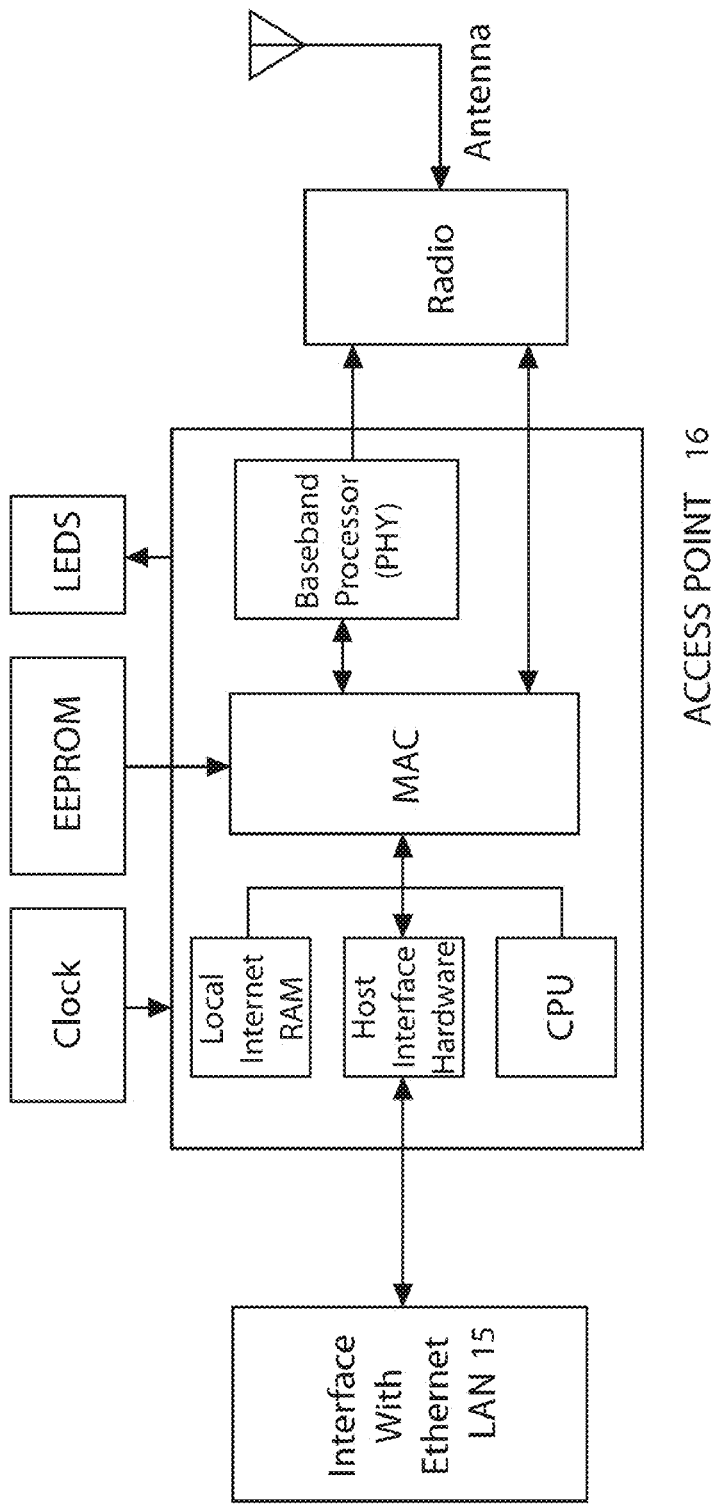
FIG. 2 is a block diagram of a typical wireless access point in the network of FIG. 1.
Figure 5:
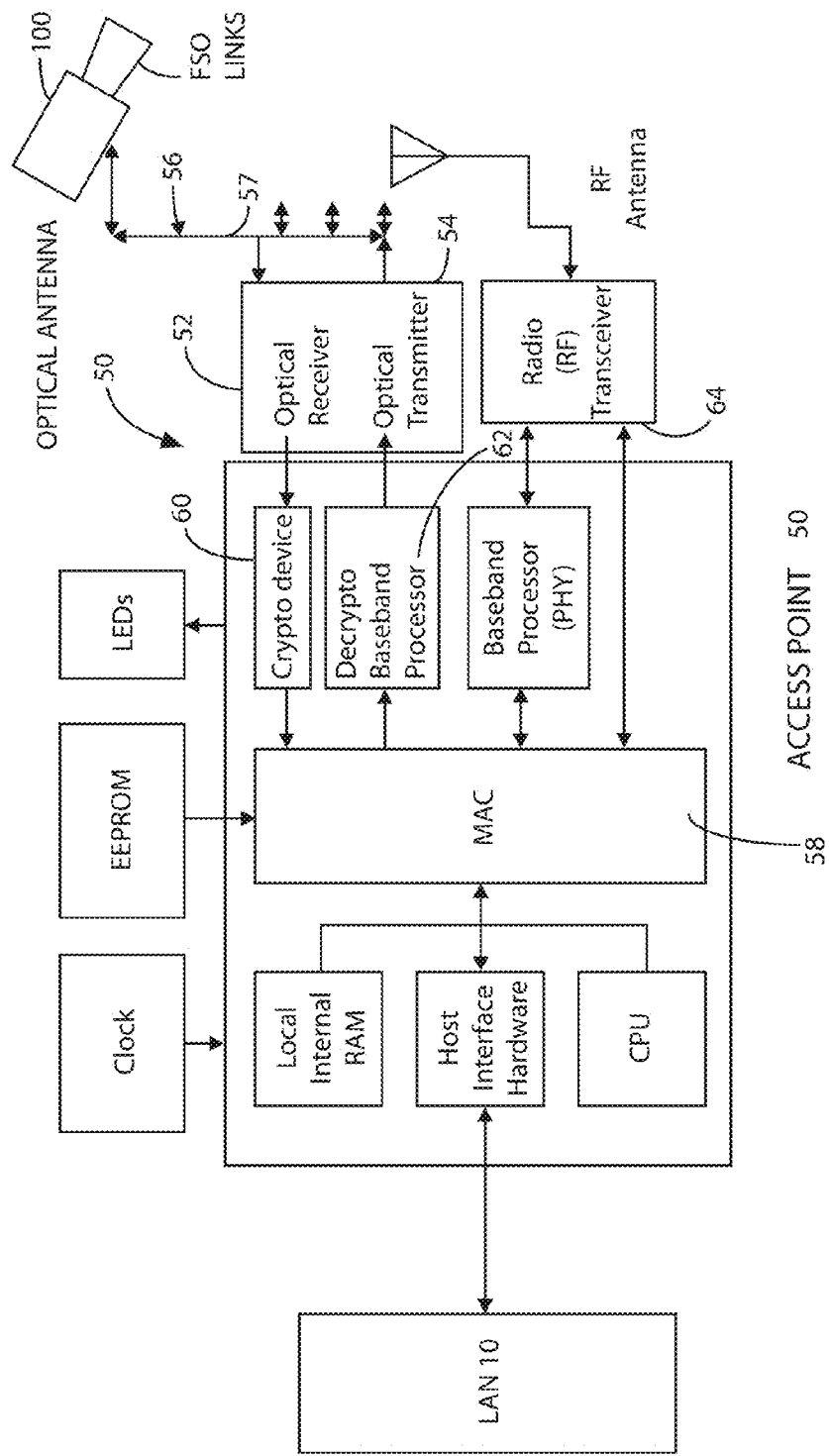
FIG. 5 is a block diagram of an integrated radio frequency (RF) and free space optical (FSO) wireless access point, according to the invention.

FIG. 5 is a schematic block diagram of a first embodiment of an integrated RF and FSO network access point 50, according to the invention. In addition to the RF components of the typical wireless access point 16 in FIG. 2, the inventive access point 50 includes an optical transceiver. The optical transceiver comprises an optical receiver 52, an optical transmitter 54, and an optical access antenna system 56 that is coupled to an input of the receiver 52 and to an output of the transmitter 54.

Figure 7A:
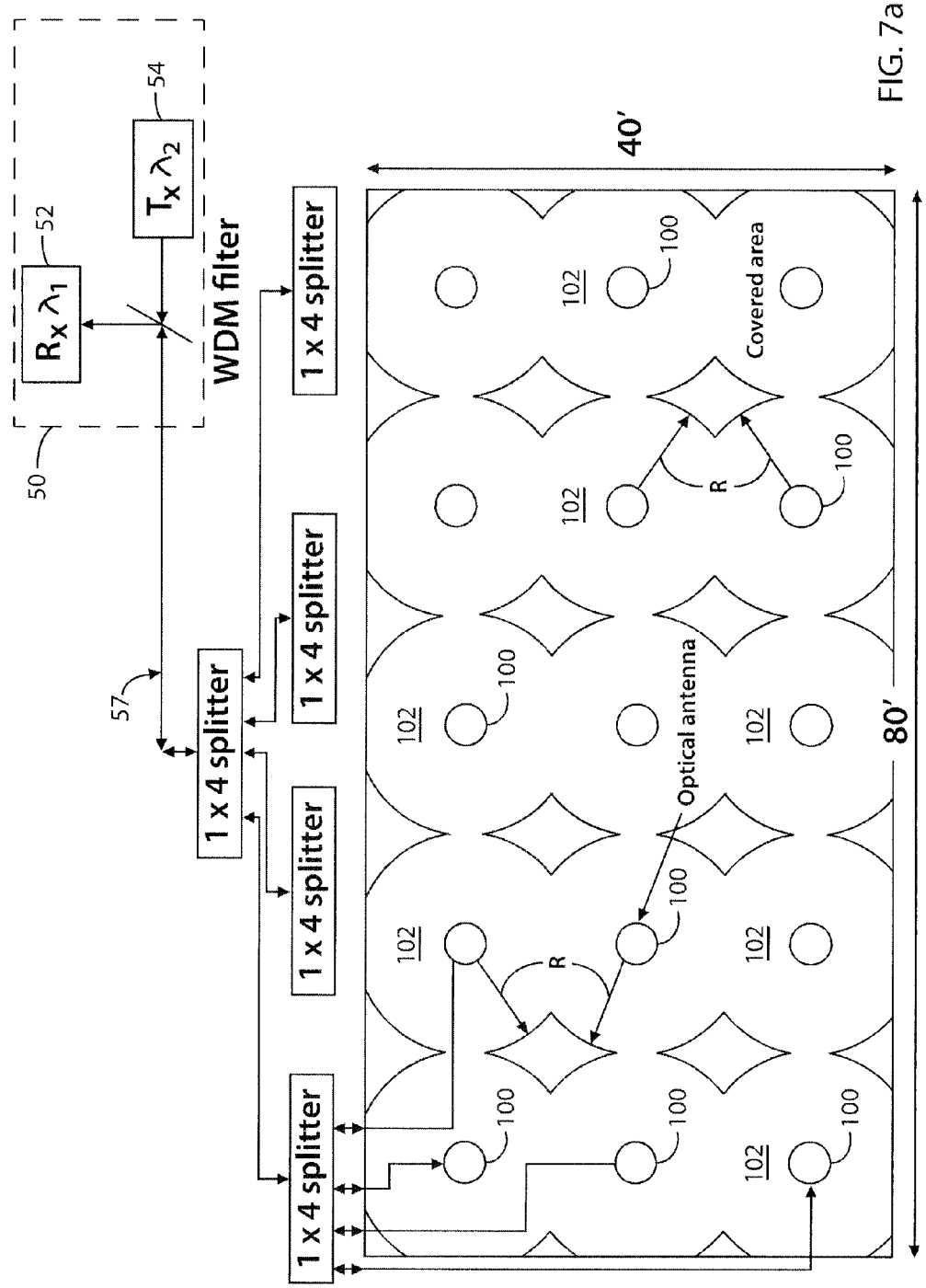
FIG. 7(*a*) illustrates a first embodiment of an optical access antenna system, including a number of optical antennas associated with the access point of FIG. 5.

The optical access antenna system 56 may be coupled to the optical receiver 52 and the optical transmitter 54 through a passive optical network (PON) 57, as shown in FIG. 7(a). The individual optical antennas 100 may be mounted, for example, in a grid array on the ceiling of one or more secure rooms access to which is restricted to authorized personnel.

In the access point 50, a baseband output of the optical receiver 52 is coupled to an input of a medium access controller (MAC) 58 through a desired crypto device 60. The crypto device 60 operates to encrypt voice data detected by the optical receiver 52, and to supply the encrypted voice data to the MAC 58. Further, the optical transmitter 54 has an input coupled to a baseband output of the MAC 58 through a corresponding decrypto processor 62. The decrypto processor 62 is configured to decode encrypted voice data received over the LAN 10 and output from the MAC 58, and to supply the decoded data to the optical transmitter 54.

Depending on the nature of voice data originating from the LAN 10 and destined to a particular handset user, the MAC 58 routes the data through only one of the optical transceiver (52, 54), or the RF transceiver 64. For encrypted secure data to be delivered from the LAN 10 to an authorized handset user, the decrypto baseband processor 62 decrypts the data before it is modulated onto a light signal by the optical transmitter 54. Voice data originating from a handset user over his/her established FSO link, is detected by the optical receiver 52 and input to the crypto device 60, as shown in FIG. 5.

Figure 3:
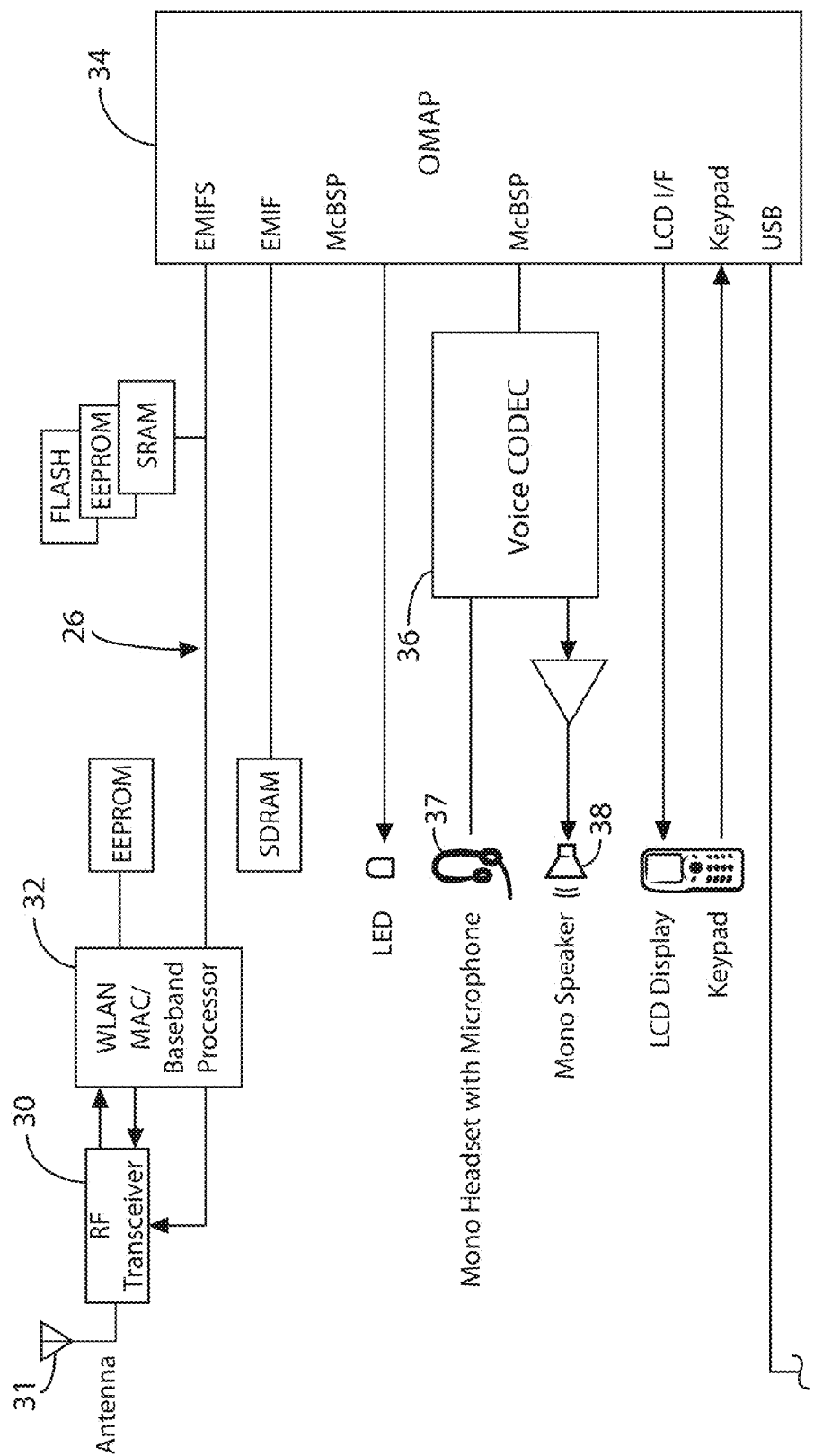
FIG. 3 is a block diagram of a typical voice over Internet protocol (VoIP) wireless telephone.
Figure 6:
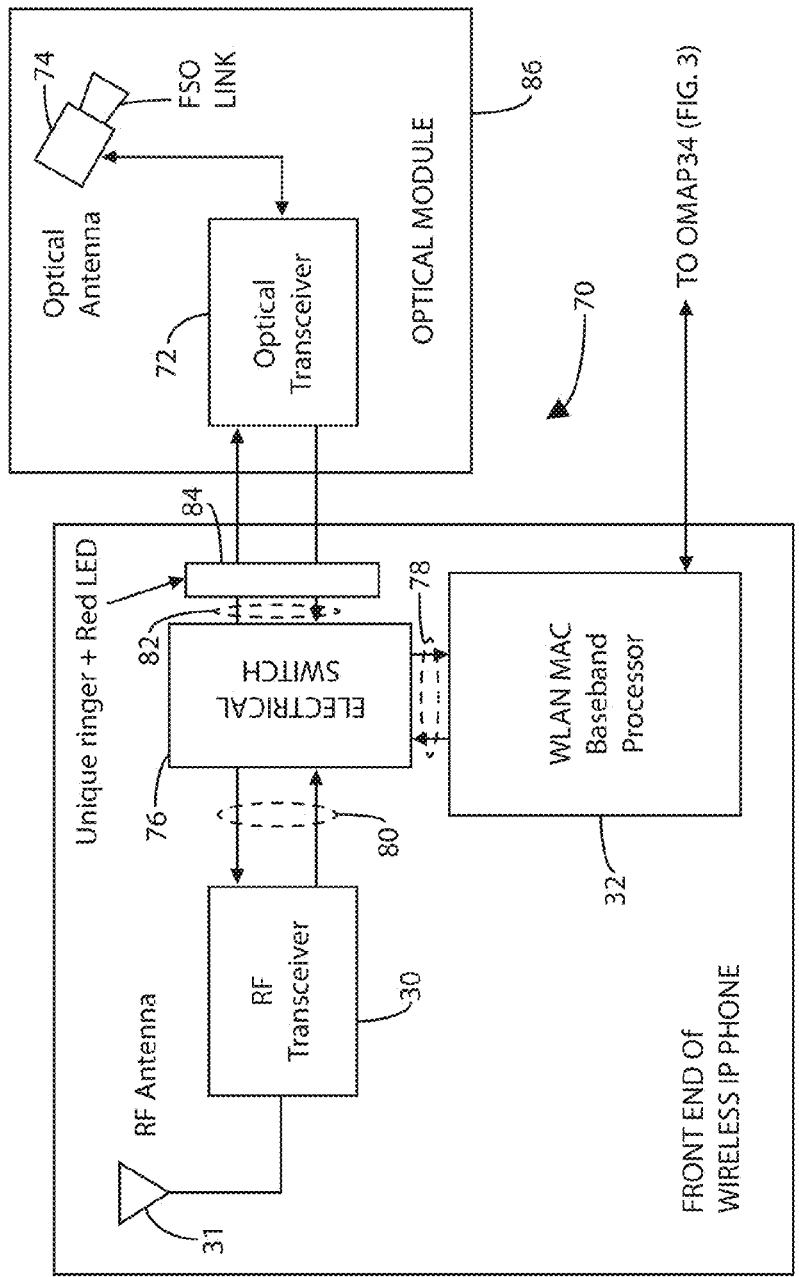
FIG. 6 is a block diagram of an integrated RF and FSO wireless handset, according to the invention.

FIG. 6 is a schematic representation of an integrated wireless RF and FSO handset (or headset) 70, according to the invention. In addition to the components of the wireless VoIP telephone 26 in FIG. 3, the handset 70 includes an optical transceiver 72, an optical antenna 74 which is coupled to the transceiver 72, and a switching stage 76. In the illustrated embodiment, the switching stage 76 has a first port 78 coupled to the MAC/baseband processor 32 of the handset 70, a second port 80 coupled to the RF transceiver 30, and a third port 82 coupled to the optical transceiver 72. The handset 70 may also feature a ringer unit 84 that is coupled to an output of the optical transceiver 72. The ringer unit 84 is constructed and arranged to produce, for example, a distinct alert sound and a blinking red LED display when the transceiver 72 detects a light signal having message data that is addressed to a user of the handset 70.

The optical antenna 74 and the transceiver 72 may be housed together in an optical module 86 that is constructed and configured to connect with the MAC/baseband processor 32 inside the handset 70 via, for example, an RJ-45 or other common wire connector interface that has been mounted onto the handset housing. The optical module 86 may be powered, e.g., by an existing voltage source (not shown) disposed in the handset 70. If desired, the switching stage 76 and the ringer 84 may be mounted and arranged inside an existing VoIP handset.

When a user of the handset 70 wants to communicate classified or other sensitive information to an authorized person on the network 40, the user operates the switching stage 76 to establish a FSO link between the handset antenna 74 and one or more of the optical antennas 100 in line of sight of the user. As mentioned, the FSO link provides communication security since the user's light signals will not propagate beyond the room or other area in which the user and the optical antennas 100 are located. A password may be entered by the user before the switching stage 76 can be operated to establish the FSO link. It is also preferable to configure the switching stage 76 so that only one of an RF or an FSO link can be established by the user at any given time. Thus, once an FSO link has been selected, there is no possibility of an inadvertent leakage of the user's secure information onto an RF link with one of the network access points 50.

As mentioned, the optical access antenna system 56 may include a grid of the individual optical antennas 100 mounted, for example, on the ceiling of a restricted occupancy room or other limited access area in a building. In the embodiment of FIG. 7(a), the passive optical network (PON) 57 may include one or more large core (e.g., >100µ) multimode optical fibers to couple the optical transceiver in the access point 50 with each of the optical antennas 100 forming the grid. Light reflectors or diffusers (not shown) may, if necessary, be provided in a given room to obtain 100% FSO connectivity for authorized users at various locations in the room. A variety of common building materials may also act as efficient diffuse infrared reflectors. For example, in the 800 to 900 nm range, plaster walls and acoustical ceiling tiles have diffuse reflectivities typically in a range between 0.6 and 0.9.

The PON 57 in FIG. 7(a) may, for example, implement a known coarse wavelength division multiplexing (CWDM) scheme. The CWDM scheme maintains large spectrum separation between the transmitting and the receiving light signals, so that available optical filters with high isolation can be used to separate the transmitted and the received light signals from one another at both ends. For example, to permit the use of low cost, large area silicon diode based detectors, a high power 950 nm laser may be used as a light source at the access point transmitter 54 for downstream (access point to user) transmissions, and an 880 nm GaAs laser/LED may be used as a light source for the transceiver 72 in the handsets 70 for upstream transmissions. The 950 nm laser can deliver up to 1 watt (W) of power which is sufficient to feed the multiple optical antennas 100, thus eliminating the need for an optical amplifier. Because eye safety is of paramount importance, however, a 950 nm wavelength may not be suitable for all applications. In such case, a 1550 nm laser may be used together with an optical amplifier to increase power level. Alternatively, an element such as a diffuser may be employed to destroy special coherence of the laser beam and spread the radiation over a sufficiently extended aperture and angle.

Figure 7B:
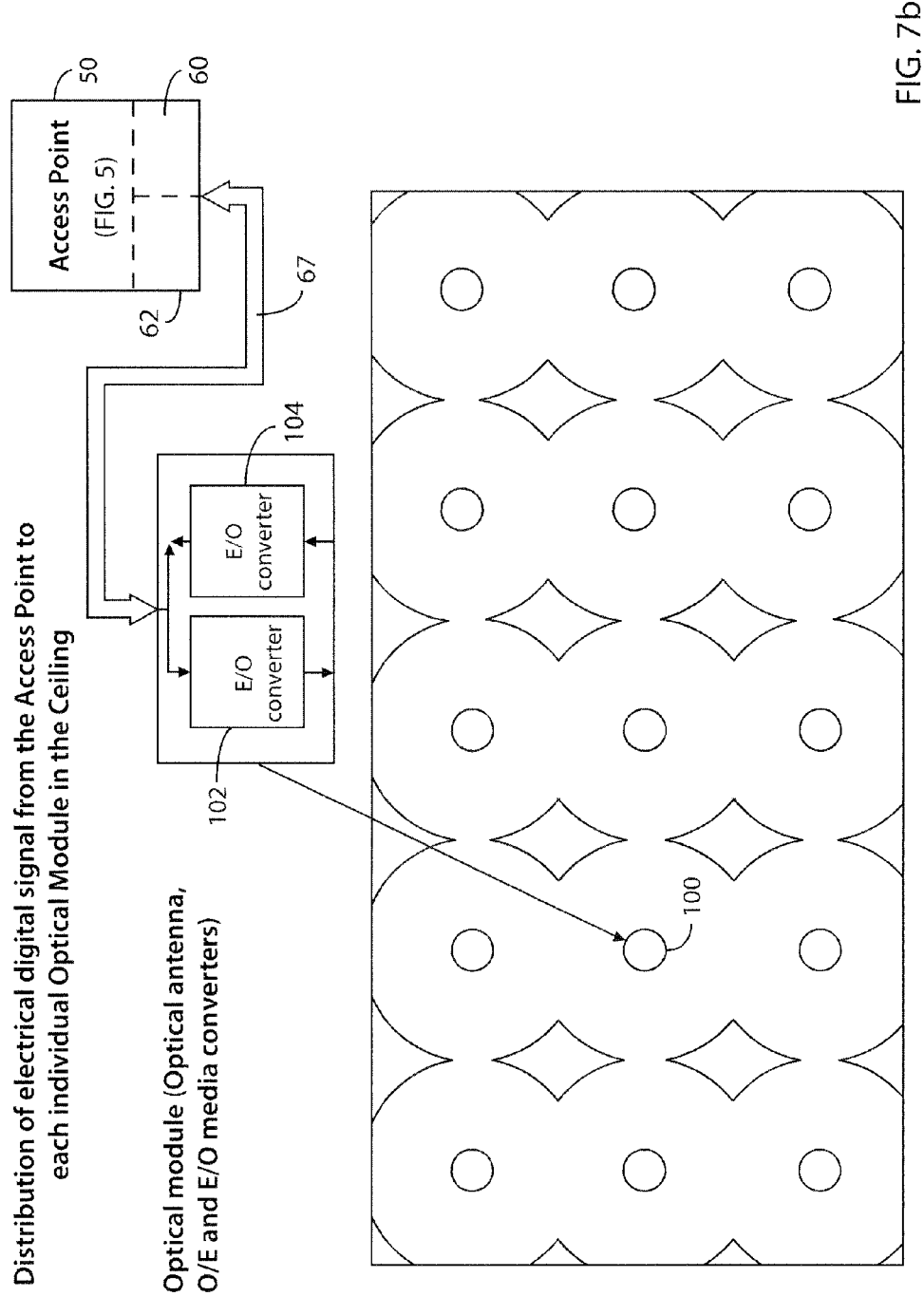

A second embodiment of the optical access antenna system 56 is shown in FIG. 7(b). In the embodiment of FIG. 7(b), the access point 50 is preferably located in the same room or other restricted area as the array of optical antennas 100 forming the optical access antenna system 56. An electrical wire or cable distribution system 67 is arranged to couple the input of the crypto device 60 and the output of the decrypto baseband processor 62 in the access point 50, with pairs of electrical to optical (E/O) media converters 102, 104. Each pair of E/O converters is associated with a given one of the antennas 100. The E/O converter 102 is configured to convert electrical signals from the decrypto baseband processor 62, into corresponding light signals to be emitted from the associated optical antenna 100 on an FSO link. The E/O converter 104 is configured to convert light signals received by the antenna 100 on the FSO link, into corresponding electrical signals for input to the crypto device 60. The E/O converters 102, 104 may incorporate suitable LEDs in the 880 to 1550 nm wavelength range for the uplink (E/O converter 104) and the downlink (E/O converter 102) message data flows. Because decrypted electrical data signals may be present on the cable distribution system 67 in FIG. 7(b), it is important that appropriate measures are taken to prevent unauthorized access or detection of any signals on the distribution system 67.

If the handsets 70 include the mentioned type G.729 codecs with compressed data headers and 100 simultaneous system users are assumed, less than 1.2 Mbit/s total bandwidth is needed in each direction for voice traffic. The light source in each antenna 100 may then take the form of a LED, a Fabry Perot (FP) broad area laser, or a GaAs VCSEL based transmitter, all of which can support the mentioned data rate.

In FIGS. 7(a) and 7(b), the optical antennas 100 are arrayed so as to enable a handset user to have a clear LOS to at least one of the antennas from any location in a given secure area. Because the PON architecture of FIG. 7(a) requires no active optical components between the access point 50 and the optical antennas 100, micro-cells 102 each of radius R less than, e.g., ten feet, may be defined. All cells may be in the same building, or spread over different buildings/rooms. For example, if the size of the building room in FIG. 7(a) is about 80'×40', it may be divided into 15 micro cells each with a radius R of eight feet. If a downstream laser from the access point transmitter 54 produces 100 mW of power and is split through a series of 1×4 splitters as shown in the drawing, at least 5 mW of power will be available at each optical antenna 100. The available antenna power may then be split further to feed four or five light transmitting elements that define each antenna 100 for covering all directions. Each antenna element will then radiate about 1 mW power for downstream optical signals after discounting any losses in the PON 57. About 1 mW of power may also be satisfactory for upstream optical signals transmitted from an antenna element on the handset 70 (see FIG. 8).

In the arrangement of FIG. 7(b), LEDs can be used as transmitting elements for both uplink and downlink, with each LED emitting more than 1 mw power. The antenna grid in FIG. 7(b) will not, however, be passive since the pairs of E/O converters 102, 104 associated with each antenna 100 will require electrical power supplied, e.g., from the access point 50 in order to operate.

In some applications it may also be desirable to employ an optical concentrator or lens to increase the effective area of each optical antenna 100. An angle-diversity receiving array using multiple receiving elements 120 oriented in different directions together with a light concentrator, may be used advantageously in place of a single receiving element as shown in FIG. 9(a). This scheme allows the receiving elements 120 to achieve high optical gain and a wide field of view (FOV) simultaneously, and may also reduce the impact of any ambient light noise and multi-path distortion. Multiple signals may be summed with equal weights, or the signal having the best signal to noise ratio (SNR) may be selected by operation of a selector/combiner stage 122.

FIG. 9(b) shows an alternative arrangement to implement angle-diversity reception, using an array of photo detector elements 130 disposed at a focal plane of an optical concentrator 132. Each detector element has an associated preamplifier 134, and the elements 130 can be fabricated in large number monolithically. Only one concentrator 132 may be needed regardless of the number of detector elements 130. The FIG. 9(b) arrangement results in a narrower FOV as shown in FIG. 9(d), when compared to the FOV in FIG. 9(c) obtained when using the receiving elements 120 in FIG. 9(a).

For upstream light signals to be beamed from the handsets 70 to one or more of the optical antennas 100, any of the mentioned devices capable of emitting light at wavelengths of 850 nm to 1550 nm may be used for the handset transmitting element 112. Typical packaged LEDs emit light into semi-angles (at half power) ranging from about 10 to 30 degrees, making them suitable for directed transmissions. A disadvantage of LEDs is their broad spectral width (typically 25 to 100 nm) which would require a wide passband for the light detectors that define the optical antennas 100 in FIG. 7(a), resulting in poor rejection of the ambient light. An array of available, low cost 850 nm VCSELs may therefore be useful to form directive light beams to carry the upstream signals from the handsets 70 in place of the single transmitting element 112. For ease of implementation and to prevent inter symbol interference due to different times of arrival of voice data from a handset user, it may be desirable to use short pulse (RZ type) on-off key modulation, NRZ, or 4-PPM.

Figure 8:
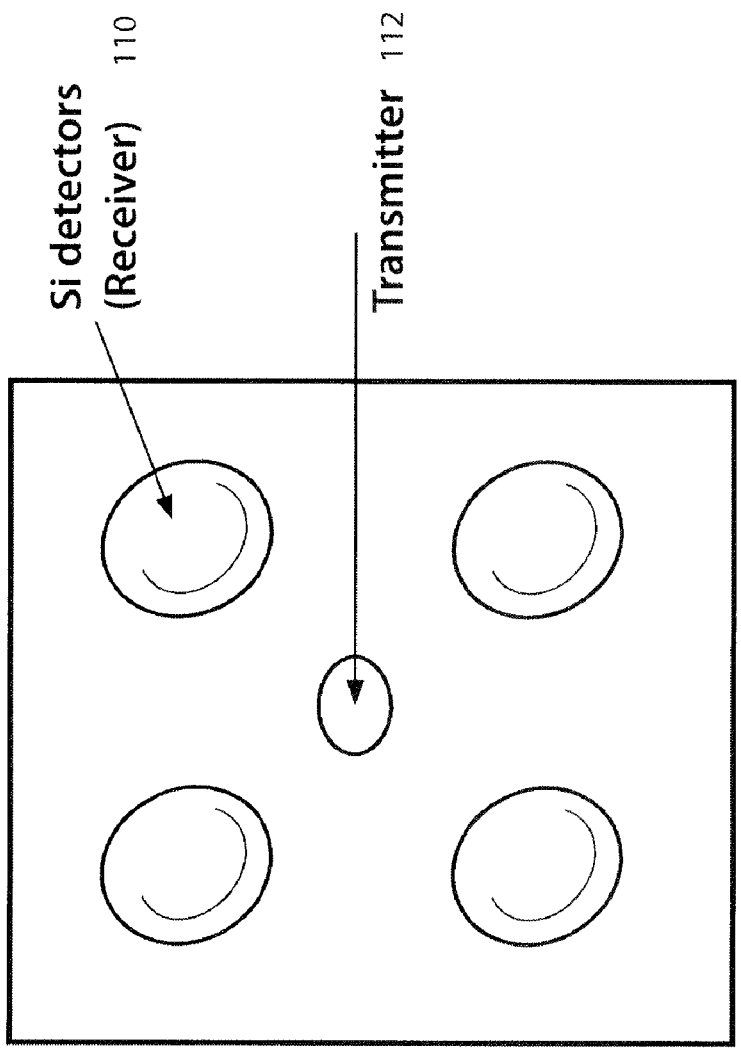
FIG. 8 shows optical transmitting and receiving elements mounted on the handset of FIG. 6.

Experimental results reported in the literature suggest that the above mentioned power levels for the light sources in the access point 50 and the handset 70, will provide adequate margins to support a data rate of about 5 Mbps using a 10 mm aperture for the handset receiving elements 110 in FIG. 8. Ultimate system performance will, of course, be limited by ambient noise and noise suppression methods.

Intense ambient IR noise in the environment of a handset user may be reduced through optical filtering and/or the use of a directional light receiving array on the handset 70 to discern a desired signal from the noise. FIG. 8 shows a quadrant array of light receiving elements 110 for high collection efficiency, and a central light transmitting element 112. The elements 110, 112 may be mounted together, for example, on an outside surface of the handset housing or on an associated headset.

Multi-megabit capacity FSO links may therefore be established by portable users on the network 40, and known time-division multiple-access (TDMA) techniques may be applied to share available bandwidth so that a number of independent voice streams will be supported simultaneously. Some level of security may also be obtained for RF links carrying unclassified voice communications between the handsets 70 and the access point 50, by using VoIP phones that incorporate known secure socket layer (SSL) technology. As mentioned, the switching stage 76 is preferably configured so as to make it impossible for the handset 70 to establish an RF link once an FSO link has been selected for secure communication.

It will be understood that final configurations of the handset optical antenna 74, and the optical access antenna system 56, will depend on the physical size and nature of the building in which the antenna system 56 is installed and the number of handset users, among other parameters. Because the voice data is preferably IP in nature and the FSO links allow a large data carrying capacity, the same architecture will support multimedia services (voice, image, and other kinds of data) seamlessly, if needed.

The inventive communication network 40 integrates optical communication techniques with emerging commercial VoIP handset technology. The network features secure photonic voice links including, if desired, a TDMA access scheme for classified audio transport within restricted areas. The network may therefore support any service (voice, data or image) now supported by existing RF wireless VoIP phone sets.

While the foregoing description represents preferred embodiments of the invention, it will be obvious to those skilled in the art that various changes and modifications may be made without departing from the spirit and scope of the invention as defined by the following claims. For example, the network 40 may extend and enhance any existing military (e.g., JTRS) or homeland security infrastructure for which a secure access feature is desired for portable or mobile users. Also, the PON 57 in the embodiment of FIG. 7(a) may implement optical wavelength division multiplexing using two wavelengths in each direction, one wavelength being used for classified and the other for unclassified voice signals.

We claim:

1. A communication network, comprising:
a local area network (LAN);
one or more wireless network access points coupled to the LAN, wherein a given network access point includes:
a medium access control (MAC) stage;
a radio frequency (RF) transmitter/receiver arranged for transmitting and receiving RF signals to and from associated wireless devices, and for enabling users of the wireless devices to gain access to the LAN by way of RF links with the access point;
an optical transmitter/receiver arranged for transmitting and receiving light signals to and from the wireless devices, and for enabling users of the wireless devices to gain access to the LAN through free space optical (FSO) links with the access point;
the MAC stage is configured (i) to direct unsecure first voice data originating from the LAN to users of the wireless devices, and to direct unsecure second voice data received from the users of the wireless devices to the LAN, by way of the RF transmitter/receiver; and (ii) to direct secure third voice data originating from the LAN to users of the wireless devices, and to direct secure fourth voice data received from the users of the wireless devices to the LAN, by way of the optical transmitter/receiver; and
an optical access antenna system coupled to the optical transmitter/receiver of the network access point, wherein at least a part of the antenna system is arranged to be within an optical range of one or more users of the wireless devices;
a decrypto processor having an input coupled to the MAC stage and an output coupled to the optical transmitter/receiver, and the decrypto processor is configured to decode encrypted secure third voice data received from the LAN and destined to the users of the wireless devices, and to produce corresponding decrypted secure third voice data at the output of the processor;
a crypto device having an output coupled to the MAC stage and operative to encrypt unencrypted secure fourth voice data received at an input of the device from users of the wireless devices and destined to the LAN, and to supply the encrypted secure fourth voice data to the MAC stage of the access point; and
one or more wireless handsets constituting the wireless devices, wherein each handset includes:
a source of unencrypted voice data;
a radio frequency (RF) transceiver constructed and arranged for transmitting RF signals corresponding to unsecure second voice data from the voice data source to at least one of the network access points, and for receiving RF signals corresponding to unsecure first voice data from the access point;
an optical transceiver for transmitting free space optical (FSO) signals corresponding to secure fourth voice data from the voice data source to the optical access antenna system, and for receiving FSO signals corresponding to secure decrypted third voice data from the optical access antenna system; and
a switching stage having a first port coupled to the source of voice data, a second port coupled to the RF transceiver, and a third port coupled to the optical transceiver, wherein the switching stage is configured to couple the source of voice data to a selected one of the RF transceiver for transmission of the unsecure second voice data, and the optical transceiver for transmission of the secure fourth voice data.

2. The communication network according to claim 1, wherein the antenna system comprises a number of optical antennas arrayed in a grid configuration.

3. The communication network according to claim 2, wherein the antenna system comprises a passive optical network (PON) connected between the optical transmitter/receiver of the network access point, and each of the optical antennas.

4. The communication network according to claim 1, wherein the antenna system comprises electrical-to-optical (E/O) converters associated with the optical antennas, and a wire cable distribution system connected at one end to the E/O converters, and at an opposite end to the decrypto processor and the crypto device of the given network access point.

5. The communication network according to claim 1, wherein the source of unencrypted voice data in a given handset comprises a microphone transducer.

6. The communication network according to claim 1, wherein the source of unencrypted voice data in a given handset includes an encoder stage configured to convert analog voice signals into corresponding digital data according to a voice over Internet protocol (VoIP).

7. The communication network according to claim 6, wherein a given handset includes a decoder stage for converting (a) voice data modulated on the RF signals received from a given network access point, and (b) voice data modulated on the light signals received from the optical access antenna system of the network, into corresponding analog voice signals.

8. The communication network according to claim 1, wherein a given handset includes an indicator stage coupled to the optical transceiver of the handset for alerting a user when light signals from the optical access antenna system of the network are detected by the optical transceiver.

* * * * *